United States Patent
Campbell (10) Patent No.: US 8,219,755 B2
(45) Date of Patent: *Jul. 10, 2012

(54) FAST HIT OVERRIDE

(75) Inventor: Brian J. Campbell, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,246

(22) Filed: Aug. 1, 2011

(65) Prior Publication Data

US 2011/0289275 A1    Nov. 24, 2011

Related U.S. Application Data

(63) Continuation of application No. 11/173,685, filed on Jul. 1, 2005, now Pat. No. 8,015,356.

(51) Int. Cl.
*G06F 12/00* (2006.01)

(52) U.S. Cl. ............... 711/118; 711/207; 711/E12.017; 711/E12.042

(58) Field of Classification Search .......................... None
See application file for complete search history.

(56) References Cited

U.S. PATENT DOCUMENTS

| 5,497,347 A | 3/1996 | Feng |
| 6,748,492 B1 * | 6/2004 | Rowlands et al. ............ 711/128 |
| 8,015,356 B2 * | 9/2011 | Campbell ..................... 711/118 |

* cited by examiner

*Primary Examiner* — Kevin Ellis
*Assistant Examiner* — Eric Loonan
(74) *Attorney, Agent, or Firm* — Lawrence J. Merkel; Meyertons, Hood, Kivlin, Kowert & Goetzel, P.C.

(57) ABSTRACT

In one embodiment, a cache comprises a tag memory and a comparator. The tag memory is configured to store tags of cache blocks stored in the cache, and is configured to output at least one tag responsive to an index corresponding to an input address. The comparator is coupled to receive the tag and a tag portion of the input address, and is configured to compare the tag to the tag portion to generate a hit/miss indication. The comparator comprises dynamic circuitry, and is coupled to receive a control signal which, when asserted, is defined to force a first result on the hit/miss indication independent of whether or not the tag portion matches the tag. The comparator also comprises circuitry coupled to receive the control signal and configured to inhibit a state change on an output of the dynamic circuitry during an evaluate phase of the dynamic circuitry to produce the first result responsive to an assertion of the control signal.

16 Claims, 4 Drawing Sheets

FAST HIT OVERRIDE

This patent application is a continuation of U.S. patent application Ser. No. 11/173,685, filed Jul. 1, 2005, now U.S. Pat. No. 8,015,356, which is incorporated herein by reference in its entirety.

BACKGROUND

1. Field of the Invention

This invention is related to the field of caches and, more particularly, to overriding hit/miss indications in a cache.

2. Description of the Related Art

Caches are typically used to reduce the average latency of accesses to a main memory system. The main memory system typically includes dynamic random access memory (DRAM) such as double data rate (DDR) synchronous DRAM (SDRAM). Caches typically have one or more orders of magnitude less capacity than the memory system, and also typically employ lower latency memory than the DRAM used in the memory system. Caches store copies of a subset of the data in memory, in units of cache blocks or cache lines. A cache block/line is the smallest unit of allocation/deallocation of storage space in the cache. Typically, caches store recently-accessed cache blocks.

Since a given storage location in the cache may store cache blocks from different memory locations in the memory system, the cache includes tags that identify the memory address of each cache block. When the cache is accessed, an input address is supplied for the memory location being accessed. The input address is compared to tags of cache block storage locations that are eligible to store the cache block identified by the address. Which cache block storage locations may store the cache block is dependent on the cache design, as discussed below. If a match between the input address and a tag is detected, the access is referred to as a hit and the access may be completed in cache. If there is no match between the input address and a tag, the access is referred to as a miss and an access to the memory system is performed to complete the operation.

There are various cache designs that are often used. A direct-mapped design provides one cache block storage location that may be used for a given cache block, based on the address of that cache block. Typically, a portion of the address (referred to as the "index") is used to select the cache block storage location. Thus, multiple addresses that have an equal index may map to the same cache block storage location. If multiple different addresses mapped to the same cache block storage location are accessed, the cache blocks corresponding to those addresses experience contention for the cache block storage location. In a set associative design, multiple cache block storage locations (collectively referred to as a "set") are eligible for a given address having a given index. Thus, contention among the addresses having the same index may be eased by the ability to store more than one cache block in the set. In a fully associative design, any cache storage location may be used for a cache block at any address.

In normal operation, one or more tags are read from the cache and compared to the input address to detect hit or miss. Additionally, the hit/miss result may be used to select which cache location outputs data for a read. There are some cases in which it is desirable to override the hit/miss detection via the tag comparison (e.g. for test purposes, to evict a cache block from the cache, etc.). Typically, such overrides are implemented by muxing the output of the tag comparison with the override hit/miss signals, and selecting the override or the tag comparison result by controlling the mux. However, the tag read, comparison, and output selection is often a critical timing path which may be a limiter on the clock frequency at which the cache (or an integrated circuit that includes the cache) may be operated. By inserting the muxes, the critical path is lengthened.

SUMMARY

In one embodiment, a cache comprises a tag memory and a comparator. The tag memory is configured to store tags of cache blocks stored in the cache, wherein the tag memory is coupled to receive an index corresponding to an input address and is configured to output at least one tag responsive to the index. The comparator is coupled to receive the tag from the tag memory and a tag portion of the input address, wherein the comparator is configured to compare the tag to the tag portion of the input address to generate a hit/miss indication. The comparator comprises dynamic circuitry and is coupled to receive a control signal which, when asserted, is defined to force a first result on the hit/miss indication independent of whether or not the tag portion of the input address matches the tag from the tag memory. The comparator comprises first circuitry coupled to receive the control signal and configured to inhibit a state change on an output of the dynamic circuitry during an evaluate phase of the dynamic circuitry to produce the first result. An integrated circuit coupled to the cache, and configured to generate the input address and the control signal is also contemplated. A method is further contemplated.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
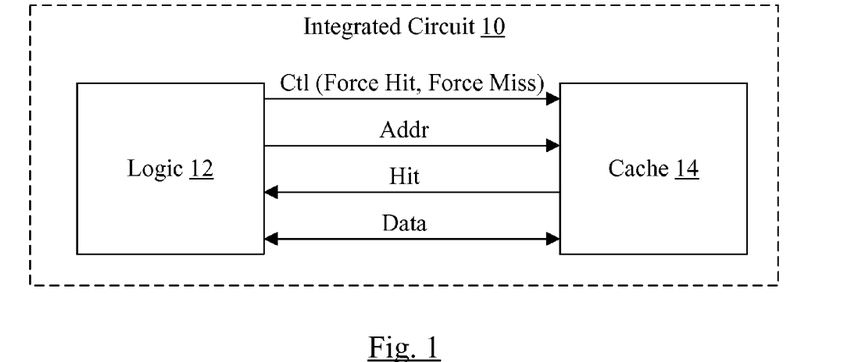
FIG. 1 is a block diagram of one embodiment of an integrated circuit.

Turning now to FIG. 1, a block diagram of one embodiment of an integrated circuit 10 is shown. In the illustrated embodiment, the integrated circuit 10 includes logic circuitry 12 and a cache 14 coupled to the logic 12. While the illustrated embodiment shows the logic 12 and the cache 14 integrated onto a single semiconductor substrate, other embodiments may implement the cache 14 separate from the integrated circuit 10.

The logic 12 may generally comprise circuitry that implements the operation for which the integrated circuit 10 is designed. For example, the logic 12 may implement a processor that is configured to execute instructions stored in memory and operate on data stored in memory. Alternatively, the logic 12 may implement direct memory access (DMA) circuitry or other input/output (I/O) circuitry that may read/write memory. Generally, the logic 12 may include any circuitry that may read/write memory data from a memory system (not shown), and some of the memory data may be cached in the cache 14. The term data, or memory data, is being used herein in the generic sense to refer to any information stored in memory (e.g. instructions for execution, data to be operated upon, etc.). When performing memory read/write operations, the logic 12 may be configured to access the cache 14.

Particularly, the logic 12 may provide an address of a memory location being accessed to the cache 14 (illustrated as Addr in FIG. 1), along with various control (Ctl) inputs. The control inputs may include whether the operation is a read or write, for example. Additionally, the control inputs may include force hit and force miss inputs, described in more detail below. The cache 14 may lookup the address and determine if a cache block corresponding to the address is stored in the cache 14. The cache 14 may signal hit or miss to the logic 12. For example, in the illustrated embodiment, a hit signal is provided by the cache 14, which may be asserted to indicate a hit (the corresponding cache block is stored in the cache 14) or deasserted to indicate a miss (the corresponding cache block is not stored in the cache 14). A cache block may correspond to an address if the cache block includes the byte identified by the address. Finally, the data for the read/write operation may be transferred between the logic 12 and the cache 14, with the direction of transfer dependent on whether a read or write operation is being performed.

The force hit and force miss control signals may be used by the logic 12 (and/or external circuitry to the integrated circuit 10, in some embodiments) to override the hit/miss determination made by the cache 14 (via tag comparison to the input address). Particularly, the force hit control signal(s) may be asserted to force a cache hit, and the force miss control signal(s) may be asserted to force a cache miss. If neither force hit nor force miss signals are asserted, then no override occurs and the tag comparison result is used to determine cache hit/miss. In one embodiment, the cache 14 comprises a set associative cache and there may be a force hit signal and a force miss signal for each way in the set. In another embodiment, the cache 14 may be a direct-mapped cache and there may be one force hit signal and one force miss signal. In fully associative embodiments, there may be one force hit signal and one force miss signal for each cache block storage location in the cache 14.

The logic 12 may use the force hit/force miss signals in a variety of fashions. For example, the logic 12 may include built-in self-test (BIST) logic used to test the functionality of the integrated circuit 10 and more particularly the cache 14. Among other things, the BIST logic may test that the data memory in the cache 14 is functional. To read/write a cache block storage location in the data memory in functional (non-test) mode, a hit to that cache block storage location must be detected. By using the force hit/force miss controls to the cache 14, the BIST logic may avoid the need to set up addresses in the tag memory in the cache 14 (see FIG. 2) to cause a hit in the desired cache block storage location in the data memory when testing the data memory. Additionally, avoiding the use of the tag memory may permit the data memory to be tested without requiring the tag memory to be functional. When diagnosing failures, the ability to isolate a failure to the tag memory or data memory, or to detect failures in the data memory even if the tag memory is faulty, may be useful. For example, the BIST logic may assert the force hit signal(s) to cause a hit in the desired cache block storage location to write test data to the desired cache block storage location or read test data from the desired cache block storage location.

In one embodiment, the logic 12 may be configured to perform various cache operations ("ops") which are defined to read a tag from the tag memory in the cache or data from the data memory in the cache into a register. The cache op identifies the cache location to be read (e.g. the way). Such a cache op may be implemented by forcing a hit during the access to the cache 14 for the cache op in the identified way.

The cache 14 is finite, and thus contention for storage space in the cache 14 may cause a cache block stored in the cache 14 to be evicted to make room for another cache block. In such cases, the address of the cache block to be evicted may not be available. For example, a cache miss may be detected for a cache block, and one of the cache block storage locations in the cache 14 may be allocated to store the missing cache block. The allocated cache block storage location may be selected in any fashion (e.g. random, least recently used (LRU), partial LRU, modified LRU, etc.). The allocated cache block storage location may be storing a cache block, and the cache block is evicted from the cache. If the evicted cache block is modified with respect to the data stored in the main memory system, the evicted cache block is read from the allocated cache block storage location to be written back to memory. During the read operation to read the evicted cache block from the cache, the index is the same as the index for the missing cache block but the remainder of the address of the evicted cache block may not be known until the tags are read. By forcing a hit in the allocated cache block storage location using the force hit signal(s), the evicted cache block may be read for writing to memory or a lower level cache (if a cache hierarchy is used). The tag from the tag memory may also be captured to obtain the address of the evicted cache block.

In the above cases, the force miss signal(s) may be used to ensure that a hit is not detected in other cache block storage locations than the desired cache block storage location (e.g. if the tag portion of the address happens to match a different tag in the tag memory). There may also be other reasons to force a miss, e.g. for test purposes.

It is noted that, while one cache 14 is illustrated in FIG. 1, there may be multiple caches in other embodiments.

Figure 2:
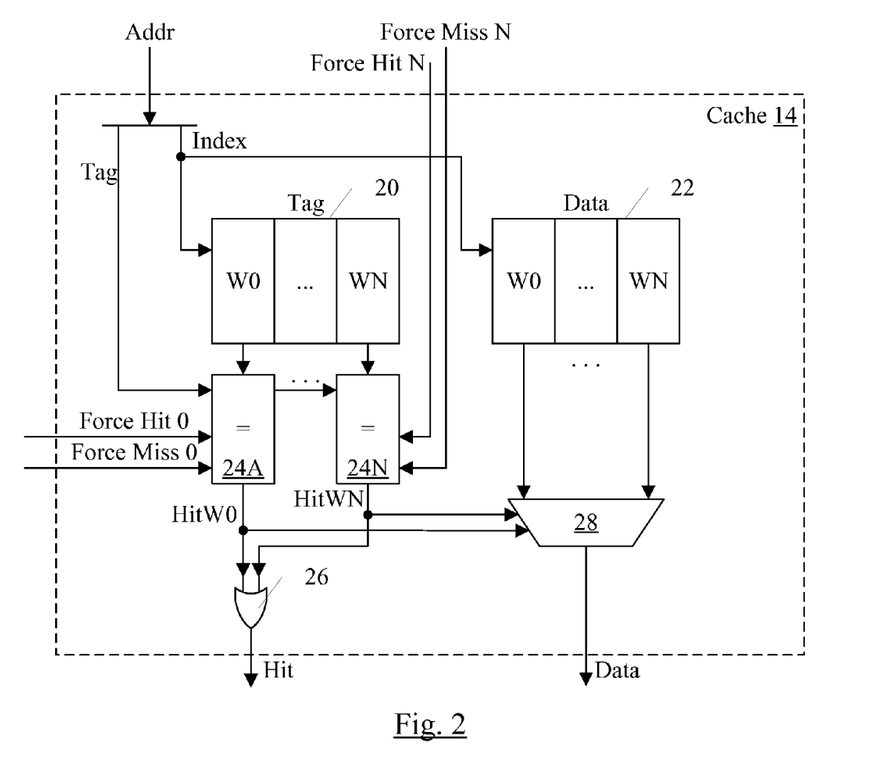
FIG. 2 is a block diagram of one embodiment of a cache shown in FIG. 1.

Turning now to FIG. 2, a block diagram of one embodiment of the cache 14 is shown. In the illustrated embodiment, the cache 14 includes a tag memory 20, a data memory 22, a set of comparators 24A-24N, an OR gate 26, and a multiplexor (mux) 28. The cache 14 is coupled to receive an input address from the logic 12, and selects an index and a tag portion from the input address. The index is input to the tag memory 20 and the data memory 22 to select a set of cache block storage locations for access. The tag memory 20 outputs tags corresponding to the indexed cache block storage locations to the comparators 24A-24N, which are also coupled to receive the tag portion of the input address. The comparators 24A-24N are also coupled to receive force hit and force miss signals (e.g. force hit 0 and force miss 0 to the comparator 24A and force hit N and force miss N to the comparator 24N. The comparators are configured to generate hit signals (HitW0 from comparator 24A and HitWN from comparator 24N), which are provided to the OR gate 26 (which generates the hit signal to the logic 12) and as selection controls to the mux 28. The mux 28 is coupled to receive data read from the data memory 22 and to provide data to the logic 12. Data input from the logic 12 may also be provided to the data memory 22 for storage (not shown in FIG. 2).

The data memory 22 comprises the cache block storage locations that store the data in the cache 14. The tag memory 20 may include corresponding tag storage locations, each tag storage location storing a tag for a corresponding cache block storage location in the data memory 22. The tag storage locations may also store various status bits, such as a valid bit for the cache line, various bits that indicate the state of the cache line, etc. The data memory 22 and the tag memory 20 may comprise static random access memory (SRAM), in some embodiments.

In the illustrated embodiment, the cache 14 is set associative and thus the tag memory 20 and the data memory 22 are illustrated as having ways 0 to N. Each way in the data memory 22 includes a cache block storage location for each index, and each way in the tag memory 20 includes a corresponding tag storage location for each cache block storage location. In response to a given index, the tag memory 20 may output a tag from each way and the data memory 22 may output data from each way. Alternatively, the data memory 22 may output a portion of the cache block (e.g. in banked implementations, where one or more bits of the cache block offset are used to select the bank). In some embodiments, the mux 28 may be incorporated into the data memory 22 (e.g. column muxing of bit lines in the data memory 22). Generally, an index may comprise any value that is derived, at least in part, from an input address to select storage locations in a memory for access in response to that address. In some cases, such as that shown in FIG. 2, the index may be selected address bits from the input address. In other cases, the selected address bits may be logically combined with other data to select a location.

The comparators 24A-24N are each coupled to receive a tag from a respective way of the tag memory 20, and compare the tag to the tag portion of the input address. In the illustrated embodiment, the comparators 24A-24N each output a hit signal, which may be asserted to indicate a hit and deasserted to indicate a miss. Other embodiments may output a miss signal, if desired. The tag, and the tag portion of the input address, may be that portion of the address which uniquely identifies a cache block that may be mapped to a given cache block storage location. Thus, the tag/tag portion excludes the offset bits of the address (which select bytes within the cache block) and also excludes the address bits used to form the index. Typically, the offset bits are the least significant bits of the address, the next least significant bits after the offset form the index, and the remaining address bits form the tag. However, any selected sets of bits may form the index and tag.

Additionally, the comparators 24A-24N receive the force hit and force miss signals, and override the comparison result to force a hit (assertion of the output signal from the comparator 24A-24N, in this embodiment) or miss (deassertion of the output signal from the comparator 24A-24N, in this embodiment) if the force hit or force miss signals are asserted, respectively. The circuitry that overrides the comparison result to force the hit or miss result may be incorporated into the comparators 24A-24N to avoid lengthening the timing path for detecting a cache hit/miss in normal operation, in some embodiments. Additional details for some embodiments are provided below.

The hit signals output by the comparators 24A-24N form selection controls for the mux 28, to select read output data from the cache 14. The OR gate 26 combines the hit signals to provide the hit signal to the logic 12.

As mentioned above, while the illustrated embodiment outputs hit signals from the comparators 24A-24N, other embodiments may output miss signals. Thus, the comparators 24A-24N may generally be viewed as outputting a hit/miss indication which indicates whether or not the input address is a hit or miss in the corresponding way of the cache 14 (and which may be forced to a desired hit/miss result using the force hit and force miss signals).

While the illustrated embodiment is a set associative cache, other embodiments may be direct-mapped for fully associative. In direct-mapped embodiments, a single comparator 24 may be used and the mux 28 may be eliminated.

Figure 3:
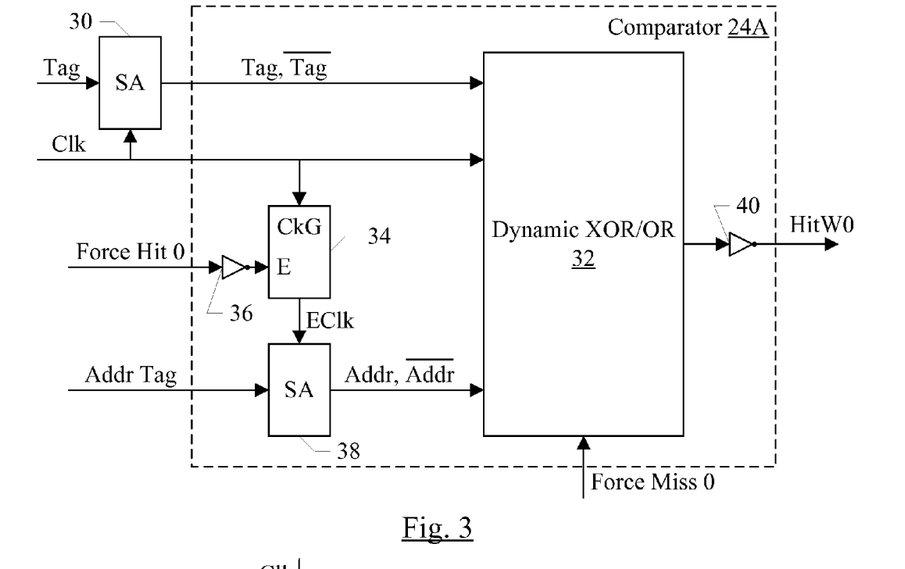
FIG. 3 is a block diagram of one embodiment of a comparator shown in FIG. 2.

Turning next to FIG. 3, a block diagram of one embodiment of the comparator 24A is shown. Other comparators such as comparator 24N may be similar. Also illustrated in FIG. 3 is a senseamp circuit 30 that may be part of the tag memory 20.

In the illustrated embodiment, the comparator 24A employs dynamic logic circuitry to perform the comparison. Generally, dynamic circuitry is precharged to a first state on its output during a precharge phase, and then the dynamic circuitry evaluates responsive to inputs during an evaluate phase. During the evaluate phase, the dynamic circuitry may conditionally change to the second state based on the inputs. For example, typical complementary metal-oxide-semiconductor (CMOS) dynamic logic includes a precharge to a low state on the output and a conditional evaluation to a high state. The output is driven by an inverter having its input coupled to an internal node which is precharged to a high state and conditionally evaluated to a low state based on inputs and the logic function implemented by the circuitry. The precharge is accomplished with a positive channel MOS (PMOS) transistor, and the evaluation is accomplished by negative channel MOS (NMOS) transistors having gates coupled to the input signals. Accordingly, state change on the output occurs based on at least one of the input signals transitioning to a high state.

Since state change in the evaluate phase may occur if the input signals transition high but may not occur if the input signals do not transition high, a signal that transitions high to represent the logical low state of the bit is used if the circuitry is to react to the logical low state of the bit. Accordingly, if both the logical high state and the logical low state of a bit are used in the logic, then a pair of dynamic signals are used to represent the bit. The first of the pair represents the true value of the bit, and thus transitions high if the bit is logically high. The second of the pair represents the complement of the bit, and thus transitions high if the bit is logically low. Therefore, during dynamic logic evaluation, one of the pair of signals transitions based on the logical state of the bit. In the drawings, the signal that represents the complement of the bit is labeled with a bar over it (e.g. the Tag and Addr labels with bars over them in FIG. 3).

Since the comparator 24A is attempting to detect equality between the tag and the tag portion of the address, the comparator 24A uses both of the pair of signals that correspond to a given tag bit and both of the pair of signals that corresponding to a given bit of the tag portion of the input address.

Figure 4:
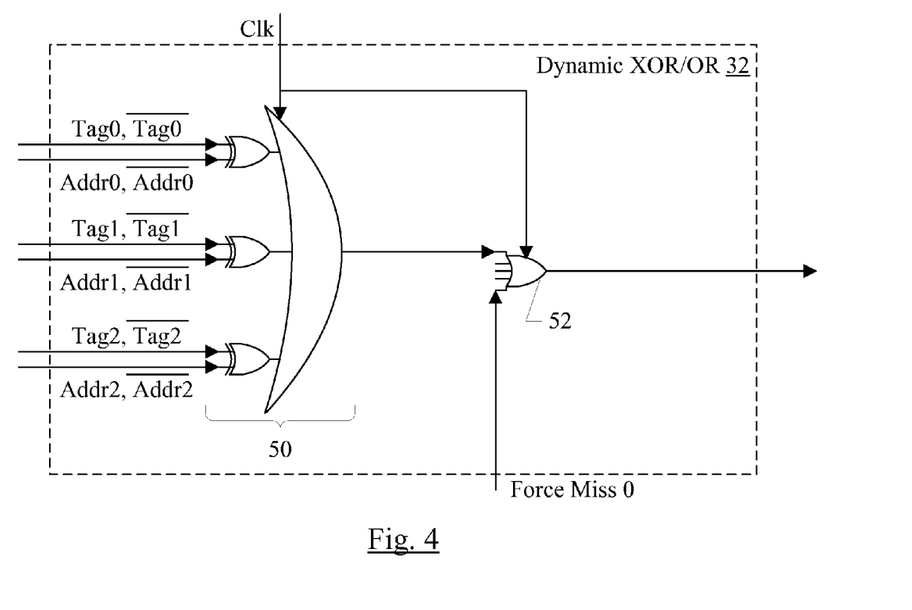
FIG. 4 is a block diagram of one embodiment of a dynamic XOR/OR circuit shown in FIG. 3.

The senseamp 30 in the tag memory 20 may output the pairs of dynamic signals for each bit of the tag read from the tag memory (shown as tag and tag bar in FIG. 4). The senseamp is coupled to receive a clock signal (clk) and "launches" the tag and tag bar signals responsive to the clock signal. A dynamic signal may be launched by asserting the high transition on the signal, if the signal is to transition for the current evaluation, thus permitting the dynamic signal to cause output state change for dynamic circuits to which it is an input. The clock signal may also be provided to a dynamic exclusive OR (XOR)/OR circuit 32 (e.g. to control the precharge and evaluate phases of the dynamic XOR/OR circuit 32) and to a clock gater circuit 34. The clock gater circuit 34 is coupled to receive an inversion of the force hit 0 signal, through an inverter 36 that has its input coupled to the force hit 0 signal, on an enable input to the clock gater circuit 34. The output of the clock gater circuit 34, an enabled clock signal (EClk) is provided as a clock input to another senseamp 38 that is coupled to receive the tag portion of the input address (Addr Tag). The senseamp 38 is configured to launch the address and address bar signals (Addr and Addr bar in FIG. 3) to the dynamic XOR/OR circuit 32 responsive to the clock input.

The dynamic XOR/OR circuit 32 XORs each bit of the tag (represented by tag and tag bar dynamic signals) with the bit from the same bit position of the tag portion of the input address (represented by address and address bar dynamic signals) and ORs the result of the XORs over all the bits of the tag and tag portion. Since an XOR produces a logical 0 if its inputs are the same, the output of the OR function is a zero (low) if the bits of the tag and tag portion are all equal and a one (high) if at least one of the bits are not equal. Therefore, the output XOR/OR function is asserted if the tag and tag portion of the input address do not match (a miss) and is deasserted if the tag and tag portion of the input address do match (a hit). An inverter 40 is used to generate the HitW0 signal.

To force a hit result from the comparator 24A, the output of the XOR/OR circuit 32 remains low, which is the precharge state of the circuit. Accordingly, if the dynamic XOR/OR circuit is prevented from changing state during the evaluate phase, the result is a hit from the comparator 24A. The clock gater circuit 34 may be used to gate the clock to the senseamp 38, preventing the launch (assertion) of the dynamic signal pairs corresponding to the tag portion of the address. Since none of the dynamic signals assert, the dynamic XOR/OR circuit 32 is prevented from changing state in the evaluation and the result is a hit. According, the force of a hit is accomplished without impacting the timing of the path, in some embodiments. In other embodiments, a clock gater circuit 34 may be used to gate the clock to the dynamic XOR/OR circuit 32, if the clock is used to prevent evaluation until the evaluation phase begins (e.g. by including an NMOS transistor with the clock as its gate input in series with the NMOS transistors that form the logic function in the XOR/OR circuit 32). In yet another embodiment, the clock gater circuit 34 may gate the clock to the senseamp 30, thus preventing the launch of the tag and tag bar signals to the dynamic XOR/OR circuit 32.

Generally, gating a clock refers to holding the clock in a steady state (e.g. low, in the present embodiment) rather than permitting the clock to oscillate between high and low. The clock gater circuit 34 includes at least one enable input, and may not gate the clock if the enable is asserted. If the enable is deasserted, the clock gater circuit 34 may gate the clock. It is noted that, in some embodiments, the clock gater circuit 34 may have multiple enable inputs, or the force hit signal may be logically combined with other enable signals to produce the enable to the clock gater circuit 34.

To force a miss result on the comparator 24A, the dynamic XOR/OR circuit 32 is forced to change state in the evaluate phase. The force miss 0 signal may thus be coupled to the dynamic XOR/OR circuit 32 in FIG. 3 and may cause the dynamic XOR/OR circuit 32 to change state, if asserted. For example, as shown in FIG. 4, the force miss 0 signal may be coupled as in input to the OR gate that produces the output signal.

In other embodiments, the force miss signal may be the signal that is used to inhibit state change of the dynamic circuitry in the comparator 24A. For example, if the dynamic XOR/OR circuit 32 and the inverter 40 were replaced with a dynamic XNOR/AND circuit, the precharge state of the XNOR/AND circuit would be miss and the dynamic XNOR/AND circuit may conditionally change state in the evaluate phase to indicate hit. In such an embodiment, an inversion of the force miss 0 signal may be input to the clock gater 34 to gate the clock to force a miss result from the comparator 24A. A hit result may be forced by ensuring that the dynamic XNOR/AND circuit changes state in the evaluate phase, e.g. by providing an inversion of the force hit 0 signal as an input to the AND.

While a senseamp circuit 38 is used to generate the address and address bar dynamic signals, any circuit that is configured to launch pairs of dynamic signals for each input bit to the circuit responsive to a clock input may be used. For example, flops or other clocked storage devices having dynamic signal outputs may be used, or any other dynamic signal generation circuit may be used.

Turning now to FIG. 4, a block diagram of one embodiment of the dynamic XOR/OR circuit 32 is shown. In the illustrated embodiment, a dynamic XOR/OR circuit 50 is shown producing an output that is an input to a dynamic OR circuit 52. The dynamic XOR/OR circuit 50 is coupled to receive the pairs of dynamic signals representing three bits (bits 0, 1, and 2) of the tag and the tag portion of the input address, and the output of the dynamic XOR/OR circuit 50 represents the result of comparing the three bits. Other inputs of the dynamic OR circuit 52 may be coupled to other dynamic XOR/OR circuits similar to circuit 50, but coupled to different sets of bits. One input of the dynamic OR circuit 52 is coupled to the force miss 0 signal, and the output of the dynamic OR circuit 52 is the output of the dynamic XOR/OR circuit 32. The circuits 50 and 52 are both coupled to receive the clock input (Clk) as well.

Figure 5:
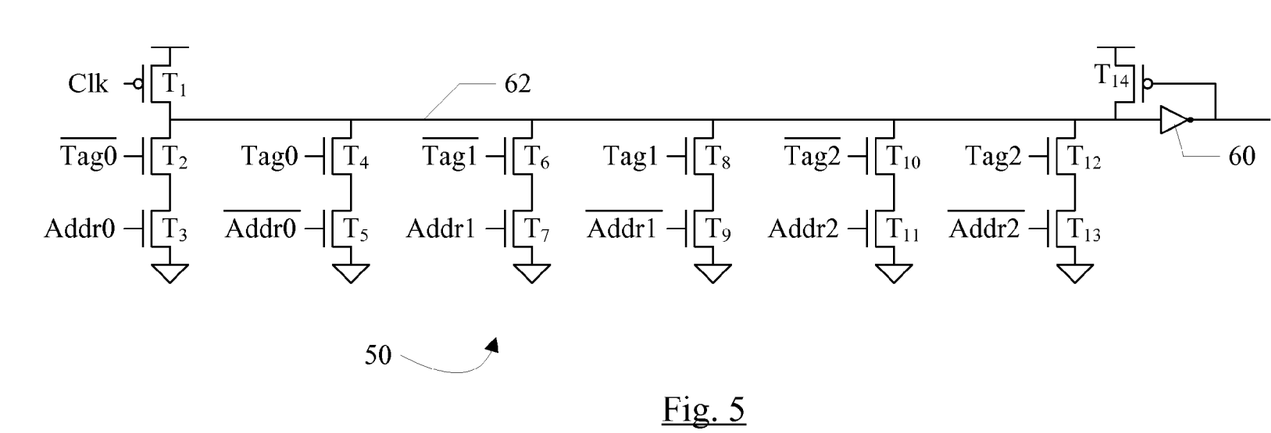
FIG. 5 is a circuit diagram illustrating one embodiment of a dynamic XOR/OR circuit.

The dynamic XOR/OR circuit 50 may be accomplished as a single dynamic stage, as shown in FIG. 5. However, providing such a circuit to handle all of the tag bits in one stage may unduly load the internal node of the dynamic XOR/OR circuit 50, which may slow precharge and evaluation and increase power consumption. The number of bits handled in one stage may be varied from embodiment to embodiment, e.g. as a function of tradeoffs in circuit size, capacitance, power consumption, etc. ORing of outputs of several such circuits may be used to generate the complete comparison result. While one level of dynamic OR 52 is shown in FIG. 4, other embodiments may implement several cascaded levels of dynamic OR. The force miss 0 signal may be an input at any such level.

FIG. 5 is a circuit diagram of one embodiment of the dynamic XOR/OR circuit 50. In the illustrated embodiment, the circuit 50 includes PMOS precharge transistor $T_1$ coupled between $V_{DD}$ and a node 62, NMOS transistors $T_2$-$T_3$ coupled in series between the node 62 and ground, NMOS transistors $T_4$-$T_6$ coupled in series between the node 62 and ground, NMOS transistors $T_6$-$T_7$ coupled in series between the node 62 and ground, NMOS transistors $T_8$-$T_9$ coupled in series between the node 62 and ground, NMOS transistors $T_{10}$-$T_{11}$ coupled in series between the node 62 and ground, NMOS transistors $T_{12}$-$T_{13}$ coupled in series between the node 62 and ground, PMOS keeper transistor $T_{14}$ coupled between VDD and the node 62, and inverter 60.

The transistors $T_2$-$T_5$ perform the XOR of the tag bit 0 and bit 0 of the tag portion of the address. Accordingly, the gates of transistors $T_2$-$T_5$ are coupled to the tag 0 bar, address 0, tag 0, and address 0 bar signals, respectively, as shown in FIG. 5. Particularly, the transistors $T_2$-$T_3$ discharge the precharge of the node 62 (and thus cause the output inverter 60 to transition high) if the tag 0 bar signal and the address 0 signal are both asserted. That is, the transistors $T_2$-$T_3$ discharge the node 62 if bit 0 of the tag is 0 and bit 0 of the tag portion of the address is a 1, which is one case of the bits not matching. The transistors $T_4$-$T_5$ discharge the node 62 for the other case of bit 0 mismatch. The transistors $T_6$-$T_9$ and $T_{10}$-$T_{13}$ similarly detect the cases of mismatch for bits 1 and 2, respectively. Accordingly, node 62 is discharged (and the output of the inverter 60 transitions high) if any of bits 0-2 of the tag and tag portion of in the input address mismatch. If all of bits 0-2 match, the node 62 is not discharged and the output of the inverter 60 remains low.

Figure 6:
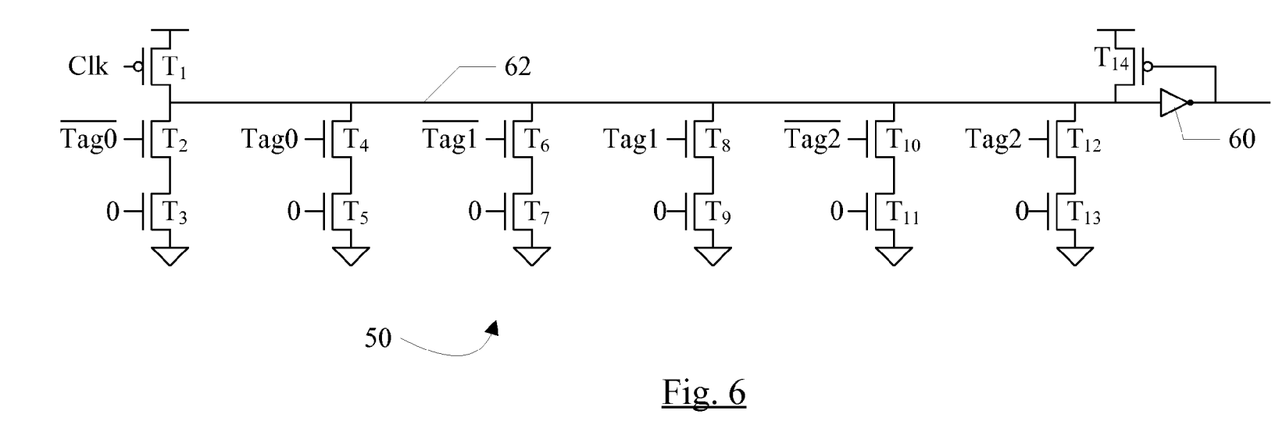
FIG. 6 is an example of override in the circuit diagram of FIG. 5.

FIG. 6 illustrates the circuit 50 of with all of the pairs of dynamic signals representing the bits of the tag portion of the address being inhibited from asserting. Each of the transistors $T_3$, $T_5$, $T_7$, $T_9$, $T_{11}$, and $T_{13}$ have their gates driven low, and thus do not conduct, preventing the discharge of node 62. A similar result may be achieved by inhibiting the assertion of pairs of dynamic signals representing the tag bits, ensuring that the transistors $T_2$, $T_4$, $T_6$, $T_8$, $T_{10}$, and $T_{12}$ do not conduct.

Figure 7:
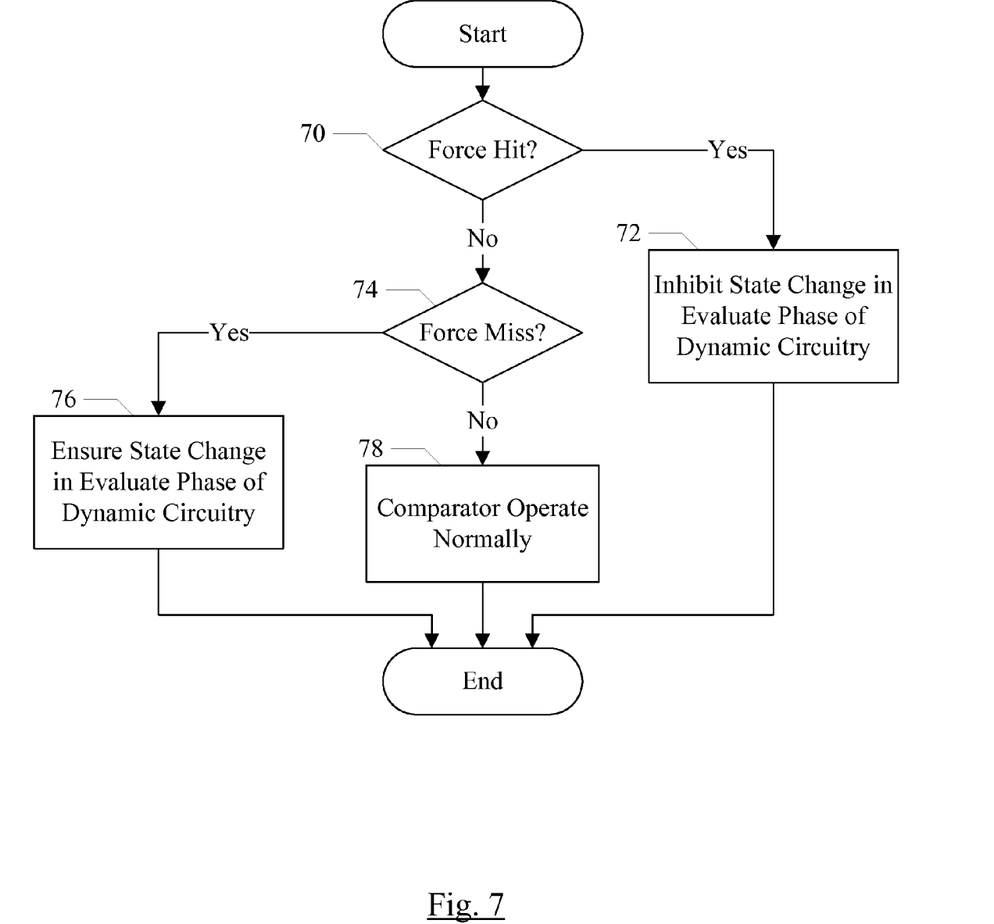
FIG. 7 is a flowchart illustrating one embodiment of a method.

Turning next to FIG. 7, a flowchart is shown illustrating one embodiment of operating a cache and providing for force hit and force miss functionality.

If forcing a hit is desired (decision block 70, "yes" leg), state change in the evaluate phase of the dynamic circuitry may be inhibited in the tag comparator for which the hit is desired (block 72). For example, the clock to the dynamic circuitry may be gated, or assertion of each signal of the pairs of dynamic signals representing the tag bits or the bits of the tag portion of the address may be inhibited. If forcing a miss is desired (decision block 74, "yes" leg), the state change in the evaluate phase of the dynamic circuitry may be ensured in the tag comparator for which the miss is desired (block 76). In other embodiments, the inhibiting of state change may be performed to force a miss and the ensuring of state change may be performed to force a hit, as discussed above. If neither a hit or a miss is to be forced (decision blocks 70 and 74, "no" legs), the comparator operates normally (signalling a hit or miss based on the tag comparison—block 78).

Numerous variations and modifications will become apparent to those skilled in the art once the above disclosure is fully appreciated. It is intended that the following claims be interpreted to embrace all such variations and modifications.

What is claimed is:

1. A cache comprising:
a tag memory configured to store tags of cache blocks stored in the cache, wherein the tag memory is coupled to receive an index corresponding to an input address and is configured to output at least one tag responsive to the index; and
a comparator coupled to receive the at least one tag from the tag memory and a tag portion of the input address, wherein the comparator is configured to compare the at least one tag to the tag portion of the input address to generate a hit/miss indication, and wherein the comparator comprises dynamic circuitry, and wherein the comparator is coupled to receive a control signal which, when asserted, is defined to force a first result on the hit/miss indication independent of whether or not the tag portion of the input address matches the at least one tag from the tag memory, and wherein the comparator comprises first circuitry coupled to receive the control signal and configured to inhibit a state change on an output of the dynamic circuitry during an evaluate phase of the dynamic circuitry to produce the first result, and wherein the output remains in a precharge state established during a precharge phase of the dynamic circuitry responsive to the first circuitry inhibiting the state change during the evaluate phase, and wherein the precharge phase and the evaluate phase are phases of the dynamic circuitry that are controlled by a clock, and wherein the dynamic circuitry is coupled to receive a plurality of pairs of dynamic signals, wherein each pair of dynamic signals represents either a bit of the tag portion of the input address or a bit of the at least one tag, and wherein a first signal of each pair represents the bit of the at least one tag or the bit of the tag portion of the input address and a second signal of each pair represents a complement of the bit of the at least one tag or the bit of the tag portion of the input address, and wherein the first circuitry is configured to inhibit assertion of the first signal and to inhibit assertion of the second signal corresponding to each bit of either the at least one tag or the tag portion of the input address responsive to an assertion of the control signal, wherein inhibiting the assertion of the first signal and the second signal results in the first result from the dynamic circuitry.

2. The cache as recited in claim 1 wherein the dynamic circuitry is coupled to receive a second control signal which, when asserted, is defined to force a second result on the hit/miss indication, wherein the second result is opposite of the first result, and wherein the dynamic circuitry is configured to change state responsive to assertion of the second control signal.

3. The cache as recited in claim 1 wherein the first result is a hit.

4. The cache as recited in claim 1 wherein the first result is a miss.

5. The cache as recited in claim 1 further comprising a plurality of comparators including the comparator, wherein each of the plurality of comparators is coupled to receive one of a plurality of tags output by the tag memory in response to the index, and wherein each of the plurality of comparators is coupled to receive a separate control signal to force the first result.

6. A cache comprising:
a tag memory configured to store tags of cache blocks stored in the cache, wherein the tag memory is coupled to receive an index corresponding to an input address and is configured to output at least one tag responsive to the index; and
a comparator coupled to receive the at least one tag from the tag memory and a tag portion of the input address, wherein the comparator is configured to compare the at least one tag to the tag portion of the input address to generate a hit/miss indication, and wherein the comparator comprises dynamic circuitry, and wherein the comparator is coupled to receive a control signal which, when asserted, is defined to force a first result on the hit/miss indication independent of whether or not the tag portion of the input address matches the at least one tag from the tag memory, and wherein the comparator comprises first circuitry coupled to receive the control signal and configured to inhibit a state change on an output of the dynamic circuitry during an evaluate phase of the dynamic circuitry to produce the first result, and wherein the output remains in a precharge state established during a precharge phase of the dynamic circuitry responsive to the first circuitry inhibiting the state change during the evaluate phase, and wherein the dynamic circuitry is coupled to receive a plurality of pairs of dynamic signals, wherein each pair of dynamic signals represents a bit of the tag portion of the input address, and wherein a first signal of each pair represents the bit and a second signal of each pair represents a complement of the bit, and wherein the first circuitry is configured to inhibit assertion of the first signal and the second signal corresponding to each bit of the tag portion of the input address to inhibit state change of the dynamic circuitry.

7. The cache as recited in claim 6 wherein the first circuitry comprises a clock gater circuit configured to supply a clock in the first circuitry, wherein the clock gater circuit is configured to gate the clock responsive to assertion of the control signal.

8. A cache comprising:
a tag memory configured to store tags of cache blocks stored in the cache, wherein the tag memory is coupled to receive an index corresponding to an input address and is configured to output at least one tag responsive to the index; and
a comparator coupled to receive the at least one tag from the tag memory and a tag portion of the input address, wherein the comparator is configured to compare the at least one tag to the tag portion of the input address to generate a hit/miss indication, and wherein the comparator comprises dynamic circuitry, and wherein the comparator is coupled to receive a control signal which, when asserted, is defined to force a first result on the hit/miss indication independent of whether or not the tag portion of the input address matches the at least one tag from the tag memory, and wherein the comparator comprises first circuitry coupled to receive the control signal and configured to inhibit a state change on an output of the dynamic circuitry during an evaluate phase of the dynamic circuitry to produce the first result, and wherein the output remains in a precharge state established during a precharge phase of the dynamic circuitry responsive to the first circuitry inhibiting the state change during the evaluate phase, and wherein the dynamic circuitry is coupled to receive a plurality of pairs of dynamic signals, wherein each pair of dynamic signals represents a bit of the tag, and wherein a first signal of each pair represents the bit and a second signal of each pair represents a complement of the bit, and wherein the first circuitry is configured to inhibit assertion of the first signal and the second signal corresponding to each bit of the tag to inhibit state change of the dynamic circuitry.

9. The cache as recited in claim 8 wherein the first circuitry comprises a clock gater circuit configured to supply a clock in the first circuitry, wherein the clock gater circuit is configured to gate the clock responsive to assertion of the control signal.

10. A method comprising:
in response to an assertion of a control signal to a cache, the assertion of the control signal defined to force a first result on a comparator output independent of whether or not a tag portion of an input address to the cache matches a tag output from a tag memory in the cache, inhibiting a state change in dynamic circuitry included in a comparator during an evaluate phase of the dynamic circuitry, wherein inhibiting the state change comprises retaining a precharge state established during a precharge phase of the dynamic circuitry, and wherein inhibiting the state change comprises inhibiting assertion of each of a plurality of pairs of dynamic signals corresponding to bits of the tag portion of the input address or the tag, wherein one of each pair represents a corresponding bit and another of each pair represents a complement of the corresponding bit; and
in response to the control signal not being asserted to the cache, the comparator performing a comparison of the tag portion of the input address and the tag output from the tag memory, the comparison including the dynamic circuitry conditionally changing state during the evaluate phase based on the tag portion of the input address and the tag output from the tag memory.

11. The method as recited in claim 10 further comprising the dynamic circuitry changing state in response to an assertion of a second control signal, the assertion defined to force a second result on the comparator output.

12. A cache comprising:
a tag memory configured to store tags of cache blocks stored in the cache, wherein the tag memory is coupled to receive an index corresponding to an input address and is configured to output at least one tag responsive to the index; and
a comparator coupled to receive the at least one tag from the tag memory and a tag portion of the input address, wherein the comparator is configured to compare the at least one tag to the tag portion of the input address to generate a hit/miss indication, and wherein the comparator is coupled to receive a control signal which, when asserted, is defined to force a first result on the hit/miss indication independent of whether or not the tag portion of the input address matches the at least one tag from the tag memory, and wherein the comparator comprises dynamic circuitry coupled to receive a plurality of pairs of dynamic signals, wherein each pair of dynamic signals represents either a bit of the at least one tag or a bit of the input address, and wherein a first signal of each pair represents the bit of the at least one tag or the bit of the input address and a second signal of each pair represents a complement of the bit of the at least one tag or the bit of the input address, and wherein the comparator is configured to inhibit assertion of both the first signal and the second signal of each pair corresponding to one of the input address or the at least one tag responsive to assertion of the control signal to produce the first result.

13. The cache as recited in claim 12 wherein the comparator comprises first circuitry coupled to receive the control signal and configured to inhibit assertion of both signals of each pair.

14. The cache as recited in claim 13 wherein the first circuitry comprises a clock gater having an enable input that is controlled responsive to the control signal.

15. The cache as recited in claim 14 wherein the first circuitry further comprises a senseamplifier circuit coupled to receive the input address and configured to generate the pairs of dynamic signals corresponding to the input address bits, wherein the clock gater is coupled to provide an evaluate clock to the senseamplifier circuit.

16. The cache as recited in claim 15 wherein the senseamplifier circuit is configured to precharge the pairs of dynamic signals to a deasserted state.

* * * * *